United States Patent
Yoon et al.

(10) Patent No.: US 11,466,862 B2
(45) Date of Patent: Oct. 11, 2022

(54) STEAM GENERATOR AND COOKING APPARATUS INCLUDING SAME

(71) Applicant: LG Electronics Inc., Seoul (KR)

(72) Inventors: Eunkyoung Yoon, Seoul (KR); Jaekyung Yang, Seoul (KR); Hakjoo Lim, Seoul (KR); Yongsoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 420 days.

(21) Appl. No.: 16/482,927

(22) PCT Filed: Jan. 30, 2018

(86) PCT No.: PCT/KR2018/001274
§ 371 (c)(1),
(2) Date: Aug. 1, 2019

(87) PCT Pub. No.: WO2018/143641
PCT Pub. Date: Aug. 9, 2018

(65) Prior Publication Data
US 2020/0011537 A1    Jan. 9, 2020

(30) Foreign Application Priority Data

Feb. 1, 2017    (KR) .................... 10-2017-0014471

(51) Int. Cl.
*F24C 15/00* (2006.01)
*A47J 27/04* (2006.01)
(Continued)

(52) U.S. Cl.
CPC ............. *F24C 15/003* (2013.01); *A47J 27/04* (2013.01); *F22B 1/28* (2013.01); *F22B 1/284* (2013.01);
(Continued)

(58) Field of Classification Search
CPC ................ A47J 27/04; A47J 2027/043; F24C 15/003; F22B 1/284
See application file for complete search history.

(56) References Cited

U.S. PATENT DOCUMENTS

| | | |
|---|---|---|
| 2010/0054717 A1 | 3/2010 | Lee et al. |
| 2015/0090706 A1 | 4/2015 | Choi et al. |
| 2015/0316252 A1 | 11/2015 | Park et al. |

FOREIGN PATENT DOCUMENTS

| | | |
|---|---|---|
| KR | 200425391 | 9/2006 |
| KR | 100824006 | 4/2008 |

(Continued)

OTHER PUBLICATIONS

Translation of KR 20-2009-0007510 (Year: 2009).*

(Continued)

*Primary Examiner* — Erin E McGrath
(74) *Attorney, Agent, or Firm* — Fish & Richardson P.C.

(57) ABSTRACT

A steam generator and a cooking device including the same, according to an embodiment of the present invention may include a water supply pipe into which steam water is introduced, a heating chamber having a chamber body and a chamber cover, and a steam heater configured to provide heat, wherein the steam heater is provided to be embedded in the chamber body and the chamber body includes a plurality of partition walls protruding in one direction along an inner peripheral surface to form a Z-shaped steam flow path through which supply water introduced into the chamber body and steam generated by heating the supply water flow. Therefore, the heat transfer, which had been concentrated only in a predetermined region, may be dispersed by the flow path formed in the chamber body, thereby stably generating the steam even in repetitive steam generation operation.

20 Claims, 8 Drawing Sheets

(51) Int. Cl.
  *F22B 1/28*   (2006.01)
  *F22B 37/26*  (2006.01)
  *F22D 5/34*   (2006.01)
  *F24C 7/08*   (2006.01)
  *F22B 37/38*  (2006.01)
  *F22B 37/70*  (2006.01)
  *F22B 37/30*  (2006.01)
  *F24C 15/02*  (2006.01)
  *F22B 35/10*  (2006.01)

(52) U.S. Cl.
  CPC ............ *F22B 35/108* (2013.01); *F22B 37/26* (2013.01); *F22B 37/30* (2013.01); *F22B 37/38* (2013.01); *F22B 37/70* (2013.01); *F22D 5/34* (2013.01); *F24C 7/08* (2013.01); *F24C 15/02* (2013.01); *A47J 2027/043* (2013.01)

(56) References Cited

FOREIGN PATENT DOCUMENTS

| KR | 2020090007510 | 7/2009 |
| KR | 1020120066737 | 6/2012 |
| KR | 1020150035618 | 4/2015 |

OTHER PUBLICATIONS

PCT International Search Report in International Application No. PCT/KR2018/001274, dated May 18, 2018, 4 pages (with English translation).

\* cited by examiner

| MEASUREMENT DATA FOR SG EFFICIENCY AND WATER DISCHARGE INTO INTERIOR | | | |
|---|---|---|---|
| | Final 100°C | Final 100°C | Final 100°C |
| | PRIOR ART | PARTITION WALLS 30° | STAGGERED PARTITION WALLS |
| Heater power (Watts) | 600 | 600 | 600 |
| WATER CONSUMPTION (cc) | 360.5 | 380.5 | 400 |
| TOTAL POWER (Wh) | 304.7 | 308.7 | 305.3 |
| Heating time (min.) | 30 | 30 | 30 |
| ENERGY CONSUMED IN STEAM GENERATION (Wh) | 257.4 | 267.4 | 276.2 |
| BOILER EFFICIENCY (%) | 84.5% | 86.6% | 90.5% |
| AMOUNT OF WATER DISCHARGED INTO INTERIOR (g) | 35cc | 5cc | LESS THAN 3cc |

FIG. 8

STEAM GENERATOR AND COOKING APPARATUS INCLUDING SAME

CROSS-REFERENCE TO RELATED APPLICATIONS

This application is a National Stage application under 35 U.S.C. § 371 of International Application No. PCT/KR2018/001274, filed on Jan. 30, 2018, which claims the benefit of Korean Application No. 10-2017-0014471, filed on Feb. 1, 2017. The disclosures of the prior applications are incorporated by reference in their entirety.

TECHNICAL FIELD

The present invention relates to a steam generator, and more particularly, to a steam generator for generating steam and a cooking device including the same.

BACKGROUND ART

A cooking device is an appliance that heats food using electricity or gas. When the food is cooked in the cooking device, the moisture of the food may be evaporated by a heating process. Accordingly, a cooking device additionally having a steam function to supply steam to the food to prevent the moisture of the food from being evaporated and dried has been provided. Such a cooking device is provided with a steam generator for generating steam.

The steam generator includes a water storage tank in which water supplied from an external water source is stored, a heating pipe through which water supplied from an external water source flows, and a heating part for heating the water flowing through the heating pipe, and the like. The steam generator may be configured to generate saturated steam by heating the water supplied from the external water source, and to supply the superheated steam generated by reheating the saturated steam to the cooking chamber of the cooking device.

Information about a prior art document is as follows:
Publication number: US2015/0316252 A1 (Publication date: Nov. 5, 2015) 2015.11.05.)
Title of invention: STEAM GENERATOR However, the conventional steam generator disclosed in the prior art document and a cooking device including the same have the following problems.

First, since the heater is located in the inner space of the steam generator in which water is accommodated, the temperature of the inner space of the steam generating device may instantaneously increase as the water level decreases during repetitive steam generating operation. In this case, the operation for generating steam may become unstable and a problem that the steam generator is defective may occur.

Second, the heat transferred by the heat source or the heater may be concentrated only in a certain region. That is, there is a problem that the temperature distribution and the heat flux inside the steam generator are not uniform. Such a problem may easily cause defects in the steam generator. Here, the heat flux means the amount of heat transferred through a unit area per unit time.

Third, the bumping phenomenon may easily occur that the steam water heated by the steam generator is generated by the heating process. Therefore, there occurs a problem that water is discharged into a cavity. Here, the bumping phenomenon is a kind of superheat phenomenon, which means that the liquid suddenly boils up and is discharged into the outside.

Fourth, when the water is discharged into the cavity, the boiler efficiency of the steam generator is lowered. The performance of the steam generator may be judged by the boiler efficiency. Here, the boiler efficiency refers to the ratio (%) of the amount of heat absorbed by the generated steam to the total heat input (based on the lower heating value).

DISCLOSURE

Technical Problem

An object of the present invention is to provide a steam generator and a cooking device including the same, capable of minimizing unstable operation and problems causing defects by instantaneously raising the temperature of the steam generator.

Another object of the present invention is to provide a steam generator and a cooking device including the same, capable of solving a problem that distribution of heat received from a heater and heat flux are ununiform in the steam generating device.

Still another object of the present invention is to provide a steam generator and a cooking device including the same, capable of minimizing the phenomenon in which water boils up or bounds due to the bumping phenomenon or the like in the steam generator.

Still another object of the present invention is to provide a steam generator and a cooking device including the same, capable of solving a problem that water is discharged into a cavity in a conventional cooking device equipped with a steam generator.

Still another object of the present invention is to provide a steam generator and a cooking device including the same, capable of improving boiler efficiency compared to a conventional steam generator.

Technical Solution

A steam generator and a cooking device including the same, according to an embodiment of the present invention may include a water supply pipe into which steam water is introduced, a heating chamber having a chamber body and a chamber cover, and a steam heater configured to provide heat, wherein the steam heater is provided to be embedded in the chamber body and the chamber body includes a plurality of partition walls protruding in one direction along an inner peripheral surface to form a Z-shaped steam flow path through which supply water introduced into the chamber body and steam generated by heating the supply water flow. Therefore, the heat transfer, which had been concentrated only in a predetermined region, may be dispersed by the flow path formed in the chamber body, thereby stably generating the steam even in repetitive steam generation operation.

A steam generator and a cooking device including the same, according to an embodiment of the present invention may include a plurality of partition walls in a chamber body. The plurality of partition walls may be spaced apart from each other a predetermined distance to form a flow path for steam and steam water in multi-tiered layers, and the steam and the steam water flowing through the flow path pass through the cross-sectional area in a predetermined range, thereby achieving uniform heat flux. In addition, distribution of the heat transferred from the heater is dispersed, thereby making the temperature distribution of the chamber body uniform.

A steam generator and a cooking device including the same, according to an embodiment of the present invention may be arranged such that a plurality of partition walls provided in a chamber body are spaced apart from one another a predetermined distance and the plurality of partition walls are formed to have an inclined angle, thereby suppressing the water from bouncing due to the bumping phenomenon or the like in the steam generator and preventing the bounding water from being discharged from the steam discharge port by the partition wall. Further, it is possible to propose a structure of the partition wall having an optimum slope capable of suppressing the bumping phenomenon by forming the partition walls such that the inclined angle is in the range of angles of 15° to 45°. Accordingly, it is possible to solve the problem of the water being discharged into the cavity in the cooking device provided with the conventional steam generator.

A steam generator and a cooking device including the same, according to an embodiment of the present invention may include a partition wall portion provided on along an inner peripheral surface of a chamber body, wherein the partition wall portion may include a first partition wall disposed at the lowermost position, a second partition disposed above the first partition wall having a protruding position on inner peripheral surface that is opposite to the protruding position of the first partition wall, and the first partition wall and the second partition wall may be formed to have staggered directions by making the slope of the first partition wall and the slope of the second partition wall downward. Due to this, the flow of the steam water and the steam is stagnated due to the bottleneck phenomenon at a point at which the flow moves from the first partition wall to the flow path of the upper layer formed by the second partition wall, thereby minimizing the bumping phenomenon and further improving boiler efficiency.

Advantageous Effects

According to the present invention, a flow path through which steam water and steam flow is formed in the inside of the chamber body, and heat can be uniformly transferred, thereby stably generating the steam. Therefore, it is possible to improve the reliability of the steam generator and the cooking device including the same.

According to the present invention, the flow path through which the steam water and the steam flow may be formed in a Z-shaped direction from the lower end to the upper end of a space inside the chamber body. Accordingly, the flow path through which the steam water and the steam flow is relatively long, and the heat can be transferred to the steam water and the steam along the flow path, thereby being able to prevent superheating in a local region.

According to the present invention, the cross-sectional area of the flow path through which the steam water and the steam pass may be formed in a predetermined range by providing a plurality of partition walls of multi-tiered layers in the up-down direction. Therefore, the heat flux and the temperature distribution become uniform, thereby suppressing the bumping phenomenon and minimizing the amount of water discharged into the cavity of the cooking device.

According to the present invention, the plurality of partition walls are formed to have inclined angles, thereby effectively preventing the steam water from boiling up and bouncing upward. In addition, since the liquid water bouncing upward is joined with the steam water back along the slope, the steam generation efficiency is improved as compared with a conventional steam generator in which water is discharged into the cavity.

According to the present invention, since the plurality of partition walls disposed in the up-down direction are formed in a staggered direction, a bottleneck is generated in the flow path for the steam water and steam, thereby improving the boiler efficiency of the steam generator. Therefore, the performance of the steam generator and the cooking device including the same can be improved.

MODE FOR INVENTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. It should be noted that if it is described in the specification that one component is "connected," "coupled" or "joined" to another component, the former may be directly "connected," "coupled," and "joined" to the latter or "connected", "coupled", and "joined" to the latter via another component.

Hereinafter, embodiments of a steam generator according to the present invention will be described in detail with reference to the accompanying drawings.

Figure 1:
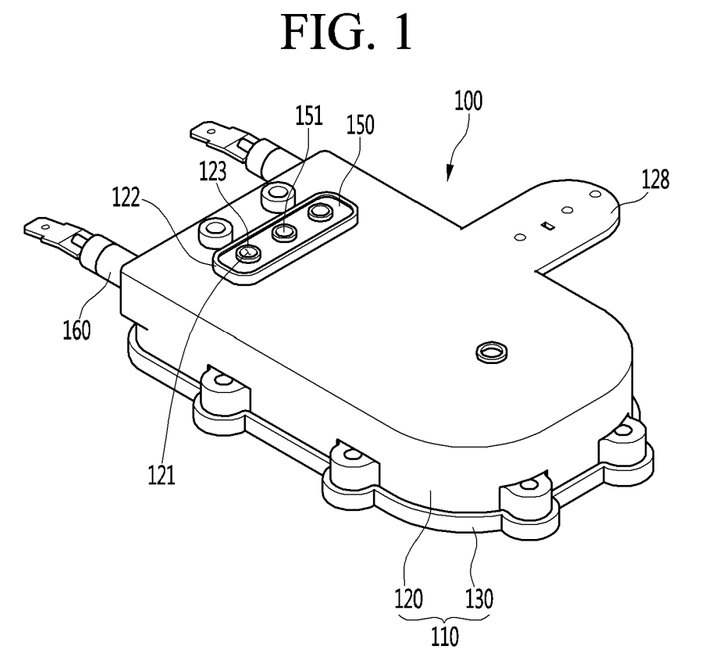
FIG. 1 is a view showing an appearance of a steam generator according to a first embodiment of the present invention.
Figure 2:
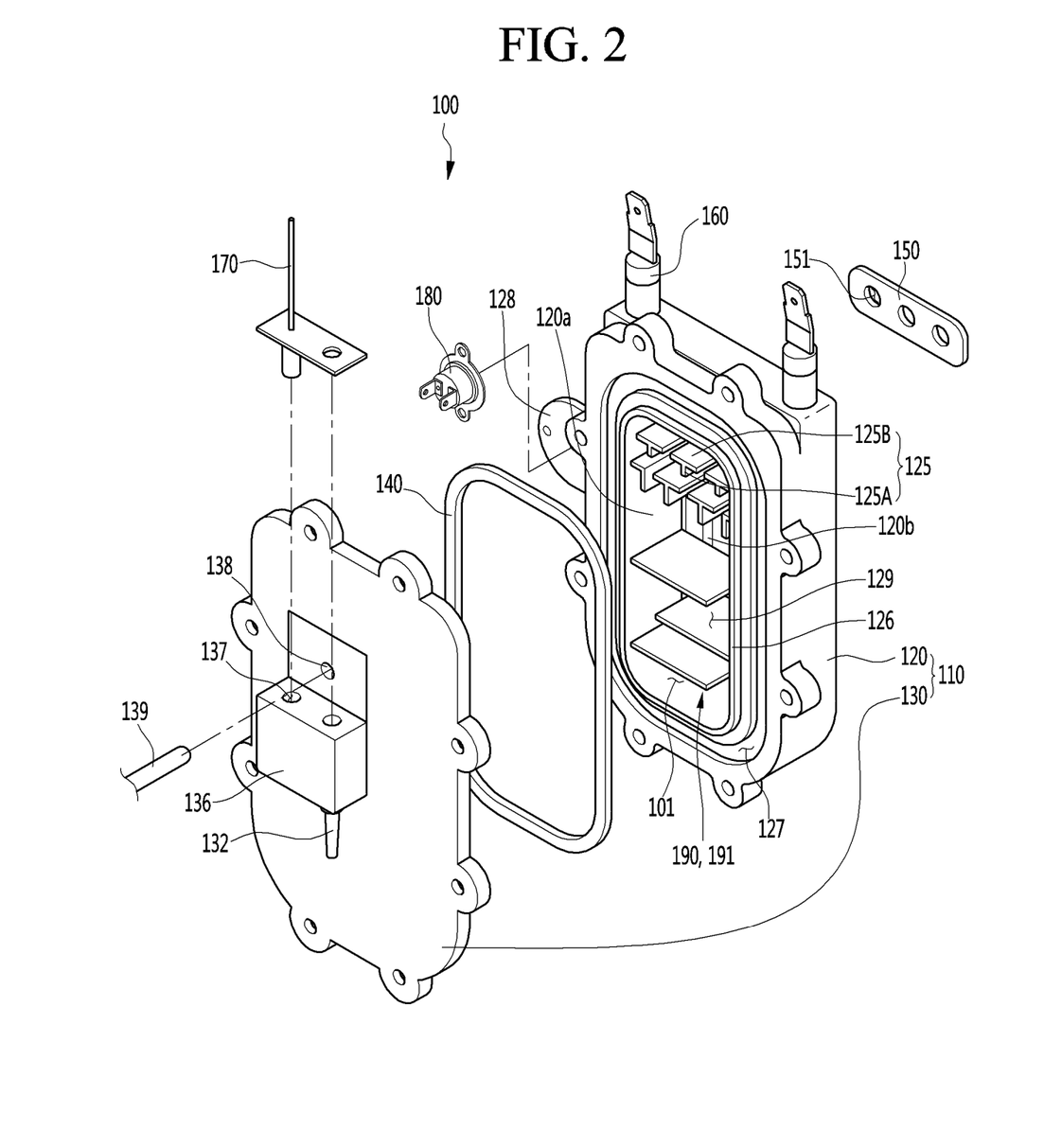
FIG. 2 is an exploded perspective view of the steam generator according to the first embodiment of the present invention.
Figure 3:
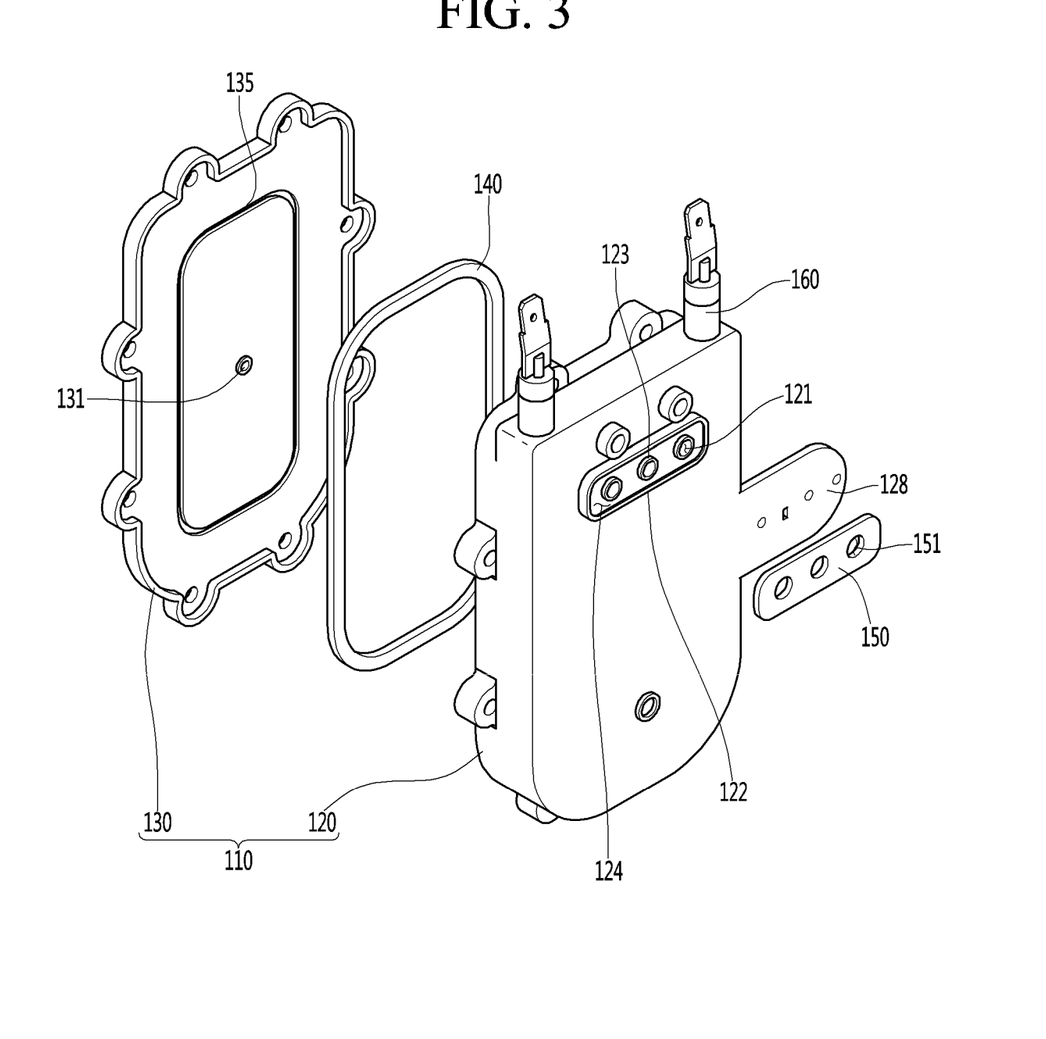
FIG. 3 is an exploded perspective view of the steam generator according to the first embodiment of the present invention when viewed at a different angle.

FIG. 1 is a view showing an appearance of a steam generator according to a first embodiment of the present invention, FIG. 2 is an exploded perspective view of the steam generator according to the first embodiment of the present invention, and FIG. 3 is an exploded perspective view of the steam generator according to the first embodiment of the present invention when viewed at a different angle.

Referring to FIGS. 1 to 3, a steam generator 100 generates steam to be supplied into a predetermined space, for example, the inside of a cooking chamber (not shown) in which food is cooked. The steam generator 100 may include a heating chamber 110, a steam heater 160, a temperature sensor 170, and a superheat prevention part 180.

The heating chamber 110 is provided with a heating space 101 in which steam water is stored. For example, the heating chamber 110 may be installed on one side of the cavity of a cooking device.

The heating chamber 110 includes a chamber body 120 and a chamber cover 130. The heating space 101 is formed by the chamber body 120 and the chamber cover 130. The chamber body 120 may include a partition wall portion 190 that defines a flow path by partitioning a part of the heating space 101. A plurality of partition wall portions 190 may be provided. The partition wall portion 190 will be described in detail later.

The shape and size of the heating space 101 are not limited. However, it is preferable that the heating space 101 has a relatively large cross-sectional area in the vertical direction as compared with a cross-sectional area in the horizontal direction. The reason for this is to improve the reheating efficiency of steam generated by heating by the steam heater 160.

The chamber body 120 may be formed in a polyhedral shape in which a part of one surface is opened. In addition, the chamber body 120 may include an inner peripheral surface 120a and a base surface 120b which form an inner space.

The inner peripheral surface 120a of the chamber body 120 may form a peripheral portion of the inner space of the chamber body 120. That is, the inner peripheral surface 120a may be understood as an inner surface formed along the periphery of the inner surface of the chamber body 120. The base surface 120b may be positioned in a direction facing the chamber cover 130. Therefore, a heating space 101 formed by the heating chamber 110 may be formed by the inner peripheral surface 120a and the base surface 120b of the chamber body and one surface of the chamber cover 130.

Of course, the shape of the chamber body 120 is not limited thereto. That is, the chamber body 120 may have a different shape as long as it can form the heating space 101 together with the chamber cover 130.

A plurality of steam discharge ports 121 are formed in the chamber body 120. The steam discharge ports 121 are portions where steam is supplied to the cooking chamber. In the present embodiment, the steam is discharged in the horizontal direction through the steam discharge ports 121 and supplied to the cooking chamber. The steam discharge ports 121 are formed in an upper end portion of the other surface of the chamber body 120 opposite to the opened one surface of the chamber body 120 and communicate with the heating space 101. The steam discharge port 121 are not necessarily located in the upper end portion of the other surface of the chamber body 120 but need be located at least above a water supply port 131 to be described later. The steam discharge ports 121 are in communication with a steam injection hole formed in the cooking chamber in a state where the heating chamber 110 is fixed to one side of the cavity 10.

A second packing seating rib 122 and steam guide ribs 123 are provided on the other surface of the chamber body 120 where the steam discharge ports 121 are formed. The second packing seating rib 122 is formed such that at least a part of the other surface of the chamber body 120 protrudes in the shape of a closed curve in which the steam discharge ports 121 are located. The steam guide ribs 123 protrude from the inner surface of a second packing seating groove 124, which correspond to the outer peripheries of the steam discharge ports 121.

The second packing seating groove 124 is formed between the second packing seating rib 122 and the steam guide ribs 123. A second packing member 150, which will be described later, is seated in the second packing seating groove 124.

In addition, the chamber body 120 is provided with a plurality of flow interfering portions 125. The flow interfering portions 125 function to interfere with the discharge of steam through the steam discharge ports 121. More specifically, the steam of which the discharge through the steam discharge ports 121 is interfered by the flow interfering portions 125 may be reheated by the steam heater 160.

The flow interfering portions 125 protrude from the base surface 120b of the chamber body 120 to substantially shield a part of the heating space 101 in the horizontal direction and simultaneously partition part of the heating space 101 in the vertical direction. Each of the flow interfering portions 125 may include a guide portion 125A formed in the vertical direction and an interference portion 125B extending in the horizontal direction from an upper end of the guide portion 125A. Accordingly, the flow interfering portion 125 may be formed inn the base surface 120b of the chamber body 120 so as to have a T-shaped or ¬-shaped longitudinal cross section. The flow interfering portion 125 is positioned on the base surface 120b of the chamber body 120 corresponding to the lower portions of the steam discharge ports 121.

The flow interfering portion 125 may be arranged in two rows vertically below the steam discharge ports 121. In this case, the guide portions 125A of the flow interfering portions 125 constituting the upper and lower rows may be positioned in regions not overlapping each other in the vertical direction, and the interference portions 125B of the flow interfering portions 125 constituting the same row may be spaced apart from each other in the horizontal direction.

A close-contact rib 126 is provided in one surface of the chamber body 120 adjacent to edges of the heating space 101. The close-contact rib 126 is formed to protrude such that a part of the one surface of the chamber body 120 forms a closed curve.

A first packing seating groove 127 is formed in the one surface of the chamber body 120 corresponding to the outer side of the close-contact rib 126. The first packing seating groove 127 is a portion in which a first packing member 140 to be described later is seated. The first packing seating groove 127 is formed so that a part of the one surface of the chamber body 120 forms a closed curve shape so as to surround the close-contact rib 126.

A mounting flange 128 is provided on one side of the rim of the chamber body 120. The mounting flange 128 extends outwardly from the chamber body 120 at one side of the rim of the chamber body 120. The mounting flange 128 is for installation of a superheat prevention part 180.

The base surface 120b of the chamber body 120 may form a contact portion 129. The contact portion 129 increases a contact area between steam water stored in the heating space 101 and the chamber body 120 such heat of the steam heater 160 is more efficiently transferred to the steam water stored in the heating space 101. In the present embodiment, the contact portion 129 may be formed in such a way that a part of the base surface 120b of the chamber body 120 is recessed. However, the contact portion 129 may be formed by recessing a part of a rear surface of the chamber cover 130.

The chamber cover 130 is fastened to the chamber body 120. In this case, the rear surface of the chamber cover 130 is in close contact with the opened one surface of the chamber body 120, thereby substantially forming the heating space 101.

The chamber cover 130 is provided with the water supply port 131. In the present embodiment, description will be given under the assumption that the water supply port 131 is located at the center of the chamber cover 130. However, the water supply port 131 may be located anywhere in the chamber cover 130, which is above the bottom surface of the heating space 101 and below the steam discharge ports 121. The water supply port 131 supplies steam water to the inside of the heating space 101 in a direction that at least does not cross or is preferably parallel to the direction in which the steam is discharged through the steam discharge port 121.

The chamber cover 130 is provided with a water supply pipe 132. The water supply pipe 132 is for supplying steam water to the heating space 101. For example, the water supply pipe 132 may be formed in a substantially '¬' shape. The water supply pipe 132 may pass through a portion of the chamber cover 130 corresponding to the lower portion of the steam discharge ports 121, for example, the center portion of the chamber cover 130. In this case, one end of the water supply pipe 132 may be exposed to the inside of the heating space 101 by passing through the water supply port 131 in a state where the chamber cover 130 is fastened to the chamber body 120. In another aspect, one end of the water supply pipe 132 may form the water supply port 131. The other end of the water supply pipe 132 extends to the outside of the heating space 101 and is connected to a water supply tube (not shown).

In the embodiment of the present invention, the water supply pipe 132 is used to supply the steam water into the heating space 101, but the present invention is not limited thereto. For example, only the water supply port 131 is formed in the chamber cover 130, and a water supply tube for supplying water to the water supply port may be connected thereto.

A partition wall portion 190 may be disposed on the rear surface of the chamber cover 130.

The partition wall portion 190 may prevent a phenomenon in which steam water supplied into the inside of the heating space 101 through the water supply pipe 132 and then falling by gravity hits against and bounces from a portion of the heating space 101, that is, on a portion of the chamber body 120 and/or the chamber cover 130. The falling distance of the steam water supplied into the heating space 101 through the water supply pipe 132 is substantially reduced by the partition wall portion 190, thereby reducing the phenomenon in which the falling steam water bounces. In addition, the partition wall portion 190 may prevent a bumping phenomenon that may occur when the steam water is heated and boiling over. A detailed description thereof will be described later.

Hereinafter, the partition wall located on the uppermost side of the partition wall portion 190 is referred to as the uppermost partition wall. A part of the heating space 101 corresponding a portion below the uppermost partition wall is referred to as a saturated region 101A and a part of the heating space 101 corresponding a portion over the uppermost partition wall is referred to as a superheated region 101B.

On the other hand, a close-contact groove 135 is formed on the rear surface of the chamber cover 130. The close contact groove 135 is formed in such a way that a portion of the rear surface of the chamber cover 130 is recessed so as to be fitted to the close-contact rib 126. Therefore, in a state where the chamber cover 130 is fastened to the chamber body 120, the close-contact rib 126 is inserted into the close contact groove 135.

A sensor mounting portion 136 is provided on the front surface of the chamber cover 130. The sensor mounting portion 136 may have a hexahedral shape protruding from the front surface of the chamber body 120. It is noted that the water supply pipe 132 passes through the sensor mounting portion 136, but the shape of the sensor mounting portion 136 is not limited thereto. The sensor mounting portion 136 may be formed with a sensor insertion hole 137 into which a temperature sensor 170 is inserted.

The temperature sensor 170 is inserted into the sensor mounting portion 136, more specifically, the sensor insertion hole 137. The temperature sensor 170 may sense the temperature of the steam water stored in the heating space 101, and substantially the temperature of the heating chamber 110. As an example, the temperature sensor 170 may be a thermistor.

The superheat prevention part 180 is mounted on the mounting flange 128. The superheat prevention unit 180 may prevent the superheating of the steam heater 160. For example, when the temperature of the steam water stored in the heating space 101 sensed by the temperature sensor 170 is equal to or higher than a predetermined safety temperature, the superheat prevention part 180 prevents the superheating of the steam heater 160 by cutting off the power supplied to the steam heater 160. As the superheat prevention part 180, a thermostat may be used.

In addition, the chamber cover 130 may form a drain hole 138. The drain hole 138 is for discharging the steam water supplied into the heating space 101 to the outside. The drain hole 138 is formed by cutting a portion of the chamber cover 130. In this case, the drain hole 138 may be located above the water supply port 131. Therefore, a water level of the steam water supplied into the heating space 101 through the water supply port 131 may be maintained at least at a height equal to or lower than the drain hole 138. A discharge tube 139 may be connected to the drain hole 138. The discharge tube 139 may provide a flow path through which the steam water discharged to the outside of the heating space 101 via the drain port 138 flows.

The first packing member 140 is provided between the chamber body 120 and the chamber cover 130. The first packing member 140 is for preventing leakage of the steam water stored in the heating space 101. When the rear surface of the chamber cover 130 is in close contact with one surface of the chamber body 120 in a state where the first packing member 140 is seated in the first packing seating groove 127, the first packing member 140 contacts the rear surface of the main body 120.

On the other hand, the second packing member 150 is seated in the second packing seating groove 124. The second packing member 150 may prevent a phenomenon in which saturated steam or superheated steam supplied to the cooking chamber through the steam discharge ports 121 and the steam injection hole leaks through a gap between a portion of the cavity 10 and the chamber body 120.

The second packing member 150 may be formed in a shape corresponding to the second packing seating groove 124. The second packing member 150 may form communication holes 151 corresponding to the steam guide ribs 123. In a state where the second packing member 150 is seated in the second packing seating groove 124, the rim of the second packing member 150 is in close contact with the second packing seating rib 122 and the steam guide ribs 123 are inserted into the communication holes 151.

The steam heater 160 heats steam water stored in the heating space 101 to generate steam to be supplied to the cooking chamber. As an example, the steam heater 160 may be inserted into the chamber body 120 so as to be positioned adjacent to the both side end portions and bottom portion of the heating space 101, thereby forming a generally U-shaped body. In another aspect, the steam heater 160 may be embedded in the chamber body 120 and positioned to be partitioned from the heating space 101. The steam water may be heated by the heat transfer through the surface contact with the inner surface 120a and the base surface 120b of the chamber body 120.

The heat of the steam heater 160 is transferred to the steam water stored in the heating space 101 through the heating chamber 110, that is, the chamber body 120 and the chamber cover 130.

In addition, the steam heater 160 may heat the steam water stored in the heating space 101 to form saturated steam, and may heat the saturated steam to form superheated steam. In detail, a portion of the steam heater 160 adjacent to the saturation region 101A heats the steam water to generate saturated steam. A portion of the steam heater 160 adjacent to the superheated region 101B reheats the generated saturated steam to generate superheated steam. Of course, the (saturated) steam generated by the steam heater 160 may be supplied to the cooking chamber or superheated steam generated by reheating the saturated steam may be supplied to the cooking chamber according to the amount of the steam water stored in the heating space 101, the output of the steam heater 160, or the like.

The above-described partition wall portion 190 will be described in detail below.

Figure 4:
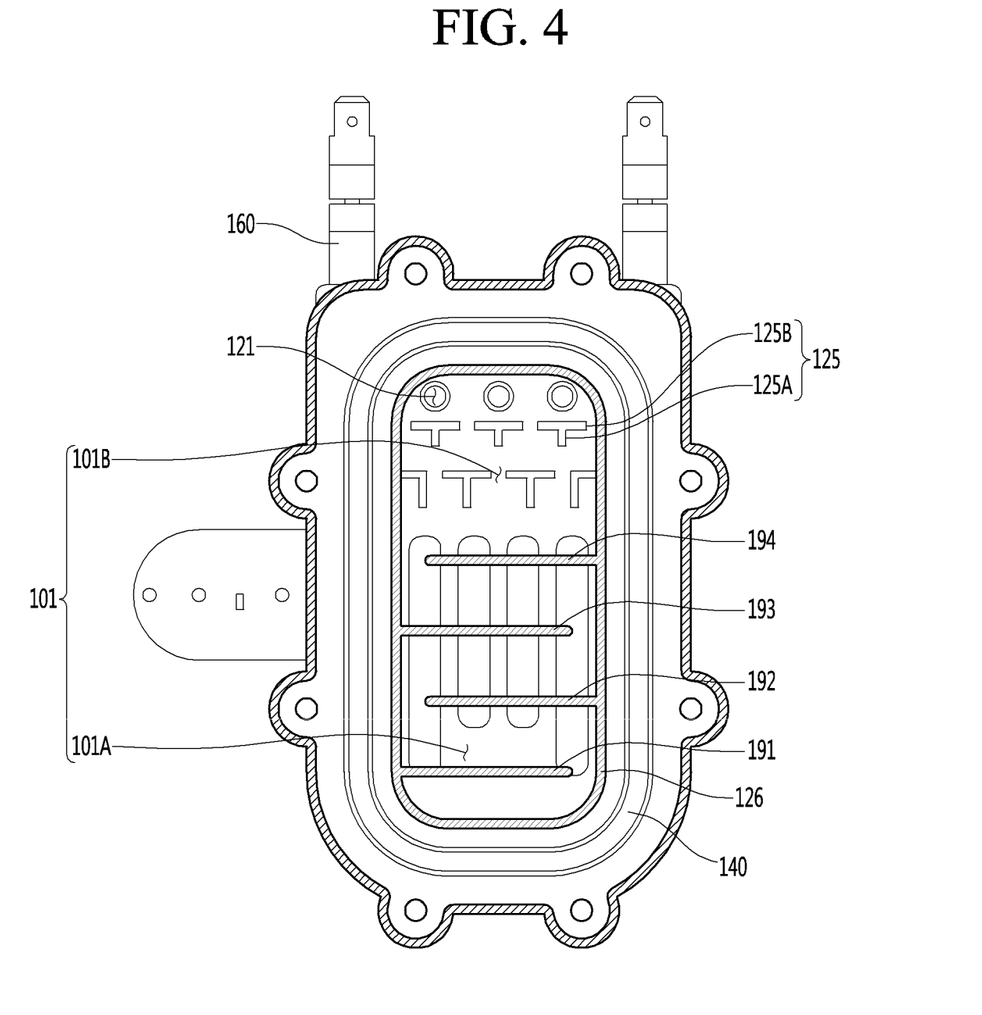
FIG. 4 is a longitudinal cross-sectional view of the steam generator according to the first embodiment of the present invention.
Figure 5:
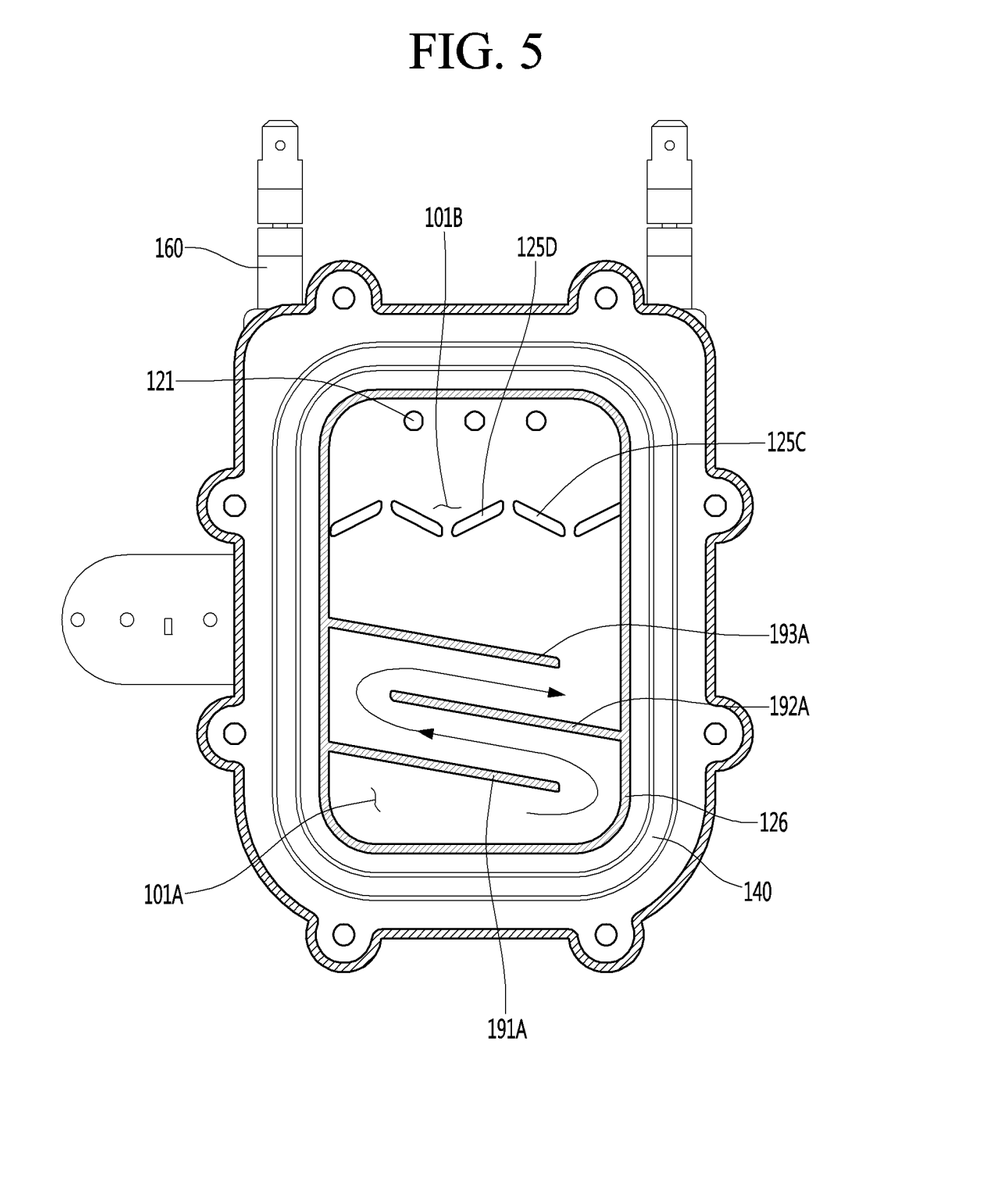
FIG. 5 is a longitudinal cross-sectional view of a steam generator according to a second embodiment of the present invention.
Figure 6:
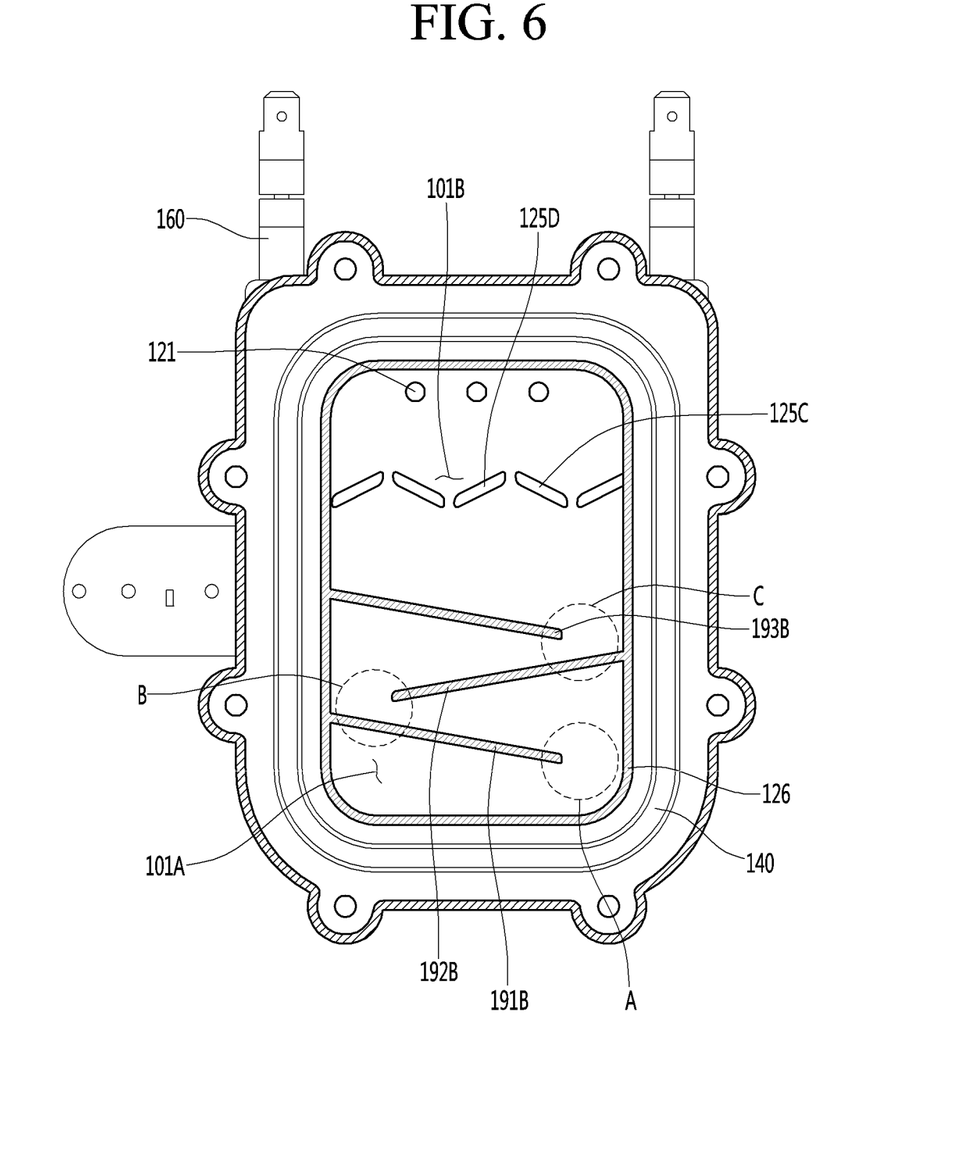
FIG. 6 is a longitudinal cross-sectional view of a steam generator according to a third embodiment of the present invention.
Figure 7:
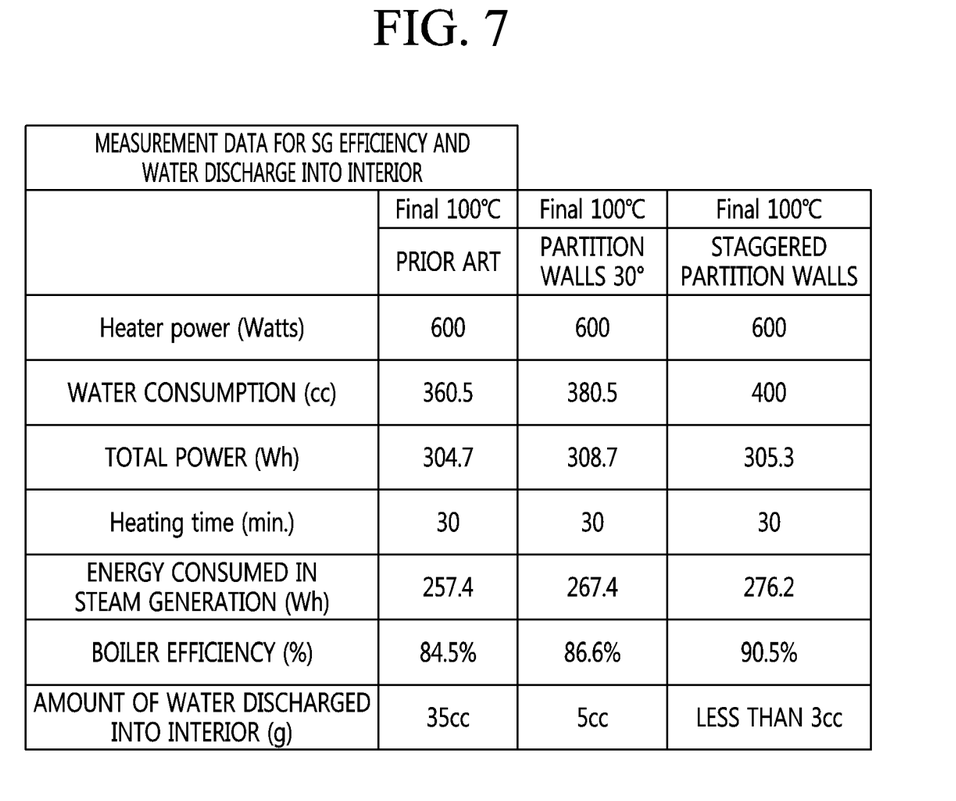
FIG. 7 is experimental data showing the effect of a steam generator according to an embodiment of the present invention.

FIG. 4 is a longitudinal cross-sectional view of the steam generator according to the first embodiment of the present invention, FIG. 5 is a longitudinal cross-sectional view of a steam generator according to a second embodiment of the present invention, FIG. 6 is a longitudinal cross-sectional view of a steam generator according to a third embodiment of the present invention, and FIG. 7 is experimental data showing the effect of a steam generator according to an embodiment of the present invention.

Hereinafter, directions are defined with reference to FIG. 4. The longitudinal direction of the steam generator 100 is defined as an up-down direction or a vertical direction. Accordingly, the steam heater 160 may protrude from an upper end of the heating body 110 to extend upward. The width direction perpendicular to the longitudinal direction of the steam generator 100 is defined as a lateral direction or a horizontal direction. Therefore, the mounting flange 128 may be provided to protrude from one side of the heating chamber 110. The inner peripheral surface 120a of the chamber body 120 may have a rectangular shape in which the lengths of the upper face and the lower face are shorter than the lengths of both side faces.

Hereinafter, a flow path through which steam water and steam flow in the heating chamber 110 is referred to as a steam flow path. That is, the steam flow path may be understood as a path through which the steam water and steam flow in the heating space 101.

First, a steam generator according to a first embodiment of the present invention will be described. Referring to FIG. 4, the partition wall portion 190 may partition a part of the heating space 101 to form a flow path. The plurality of partition wall portions 190 may be provided.

The partition wall portion 190 may be provided on the inner surface of the chamber body 120 and may be positioned in the heating space 101. In detail, the partition wall portion 190 may protrude from one point of an inner peripheral surface 120a of the chamber body 120 and extend toward an inner peripheral surface 120a facing the inner peripheral surface 120a.

In another respect, the partition wall portion 190 may be formed to protrude from one point of the base surface 120b of the chamber body and extend toward the chamber cover 130 facing the base surface 120b.

The partition wall portion 190 may be formed to extend to the inner peripheral surface 120a positioned in the extending direction, or a position spaced apart from the inner peripheral surface 120a a predetermined distance to form a flow path for steam water and steam in the heating space 101.

However, for convenience of description, the embodiment of the present invention will be described on the assumption that the partition wall portion 190 protrudes from a point on the inner peripheral surface 190a to a point where the inner peripheral surface 190a facing thereto extends to a point spaced apart from the facing inner peripheral surface 190a.

That is, an end of the partition wall portion 190 may be spaced apart from the inner peripheral surface 120a of the chamber body 120. Herein, the end of the partition wall portion 190 may be understood as an end portion of the partition wall portion 190 in the extending direction.

Meanwhile, the partition wall portion 190 may be formed to extend laterally from any one side of the inner peripheral surface 120a. As an example, the partition wall portion 190 may extend from one side of the inner peripheral surface 120a toward the other side, and an end formed in the extending direction of the partition wall portion 190 may be spaced apart from the other side, thereby allowing the heating space 101 to be vertically communicated. Accordingly, the steam water and steam may flow into a space (spaced space) between the end of the partition wall portion 190 and the inner peripheral surface 120a.

The partition wall portion 190 may include a first wall 191 and a second wall 192 located above the first wall 191 to form a plurality of layers in the heating space 101 in the vertical direction. The first wall 191 and the second wall 192 may extend in opposite directions in the heating space 101.

The first wall 191 may be regarded as the partition 190 located at the lowermost one of the plurality of partition wall portions 190 positioned in the heating space 101.

The first wall 191 may protrude horizontally from one point of the inner peripheral surface 120a and extend to a position spaced apart from the inner peripheral surface 120a facing the one point a predetermined distance.

The second wall 192 may be formed above the first wall 191. The second wall 192 may protrude horizontally from another point of the inner peripheral surface 120a over the first wall 191, and extend to a position spaced apart from the inner peripheral surface 120a facing the another point a predetermined distance.

Herein the extending direction of the first wall 191 is referred to as a first extending direction, the extending direction of the second wall 192 is referred to as a second extending direction, and the extending direction of the third wall 193, which is described below, may be referred as a third extending direction.

The second wall 192 may have an extending direction opposite to the extending direction of the first wall 191. That is, the second extending direction may have a direction opposite to the first extending direction. As one example, the first wall 191 may horizontally extend from the left side of the inner peripheral surface 120*a*, and the end of the first wall may be positioned to form a spaced space from the right side of the inner peripheral surface 120*a*. In this case, the second wall 192 may horizontally extend from the right side of the inner peripheral surface 120*a*, and the end of the second wall may be positioned to form a spaced space from the left side of the inner peripheral surface 120*a*.

The first wall 191 and the second wall 192 may partition the heating space 101 in the up-down direction so as to form multi-tiered layers.

A first layer, a second layer, a third layer, and a fourth layer may be formed in the heating space 101 partitioned by the partition wall portion 190 from the lower side toward the upper side. The steam flow path may be formed to pass through the first to fourth layers in order.

The first layer means a heating space 101 formed below the first wall 191. The second layer means a heating space 101 formed between the first wall 191 and the second wall 192. Similarly, the third layer means a heating space 101 formed between the second wall 192 and a third wall 193 to be described later, and the fourth layer means a heating space 101 formed between the third wall 193 and a fourth wall 194 to be described later.

Steam water and steam supplied to the heating space 101 may fill the first layer by the first wall 191 and rise after the first layer is completely filled to start filling the second layer. That is, the steam water and the steam may flow from the first layer to the second layer, the third layer and the fourth layer in order. Accordingly, the steam flow path may flow while forming a long flow path in the zigzag direction along the first wall 191, the second wall 192, the third wall 193 and the fourth wall 194 to be described later. That is, the steam flow path may form a Z-shaped flow path.

The partition wall portion 190 may further include the third wall 193 disposed above the second wall 192 and the fourth wall 194 disposed above the third wall 193.

The extending direction of the third wall 193 may extend in a direction opposite to the extending direction of the second wall 192. The extending direction of the third wall 193 may be the same as the extending direction of the first wall 191. That is, the third extending direction may have a direction opposite to the second extending direction, and may have the same direction as the first extending direction. For example, the third wall 191 may be formed on the upper side of the second wall 192 by moving the first wall 191 upward in parallel. Therefore, a detailed description of the third wall 193 refers to the description of the first wall 191.

The extending direction of the fourth wall 194 may extend in a direction opposite to the extending direction of the third wall 193. That is, the extending direction of the fourth wall 194 may be the same as the extending direction of the second wall 192. For example, the fourth wall 194 may be formed on the upper side of the third wall 193 by moving the second wall 192 upward in parallel. Thus, a detailed description of the fourth wall 194 refers to the description of the second wall 192.

The third wall 193 and the fourth wall 194 are described as an example of forming the steam flow path, and the number of the partition wall portions 190 may be increased or decreased. That is, the number of the partition wall portions 190 is not limited to the four partition wall portions described in the present embodiment. Therefore, the number of the partition wall portions 190 may be appropriately selected to form a Z-shaped steam flow path in consideration of the size of the steam generator 100, the size of the cross-sectional area of the flow path, and the like.

On the other hand, the cross-sectional area of the steam flow path may be formed to have an area within a certain range. For example, the distance between the first wall 191 and the second wall 192 may be equal to the distance between the second wall 192 and the third wall 193. Similarly, the distance between the third wall 193 and the fourth wall 194 may be equal to the distance between the second wall 192 and the third wall 193. Accordingly, since the cross-sectional area of the steam flow path is formed to be uniform, there is an advantage that the heat flux of the steam water and the steam flowing through the steam flow path may be uniform. When the heat flux becomes uniform, it is possible to suppress the bumping phenomenon in which the steam water boils up abruptly due to local heating. Therefore, it is possible to minimize the problem of the conventional steam generator in which the steam water is discharged into the cooking chamber by the bumping phenomenon.

In summary, the flow path through which the steam water and the steam flow is formed to have a Z-shape by the partition wall portions 190 forming multi-tiered layers in the up-down direction, and the flow path may be relatively long. Accordingly, since the heat transferred from the steam heater 160 is transferred to the steam water and the steam spreading along the flow path, heat transfer may be efficiently performed, and local superheating may be prevented.

In addition, the cross-sectional area of the flow path through which the steam water and the steam pass may be formed to have an area within a certain range by the partition wall portions 190. This makes the heat flux and the temperature distribution of the steam water and the steam flowing through the flow path uniform. Therefore, the bumping phenomenon may be suppressed. And the amount of water discharged into the cavity (interior) of the cooking device may be relatively minimized.

In addition, since the liquid water bouncing when the steam water is heated falls on the partition wall portions 190, the liquid water is not discharged to the cooking device, but is reheated again to achieve a phase change to steam. That is, the steam generation efficiency may be increased.

Hereinafter, the steam generator according to the second embodiment of the present invention will be described focusing on the differences from the first embodiment described above. In the second embodiment of the present invention, the description of the first embodiment refers to the description of the same configuration as that of the first embodiment.

Referring to FIG. 5, the partition wall portion 190 may extend to have a slope in the heating space 101. Specifically, the partition wall portion 190 may include a first wall 191A, a second wall 192A, and a third wall 193A that are formed to extend from the inner peripheral surface 120*a* of the chamber body to have an inclined angle.

With respect to a virtual first horizontal line drawn horizontally at a point where the first wall 191A protrudes from the inner peripheral surface 120*a*, an acute angle between an extension line drawn along the first extending direction and the first horizontal line is referred to as a first inclined angle. With respect to a virtual second horizontal line drawn horizontally at a point where the second wall 192A protrudes from the inner peripheral surface 120a, an acute angle between an extension line drawn along the second extending direction and the second horizontal line is referred to as a second inclined angle. Similarly, a description of a third inclined angle of the third wall 193A, which may be formed symmetrically on the upper side of the first wall 191A refers to the description of the first inclined angle.

The inclined angle may be in the range of 15° to 45° with respect to a horizontal line parallel to an extension line drawn along the upper surface and lower surface of the inner peripheral surface 120a. For example, the partition wall portion 190 may extend upward or downward so as to have a slope of 30° from one side of the inner peripheral surface 120a.

The first wall 191A may be formed to protrude from the one side of the inner peripheral surface 120a and extend along the inclined angle. The first wall 191A may extend such that an end thereof is spaced apart from the other side of the inner peripheral surface 120a. The steam water and the steam may flow into a space A between the end of the first wall 191A and the inner peripheral surface 120a to flow into the upper layer (second layer) of the heating space 101.

The second wall 192A may be disposed above the first wall 191A and may extend in a direction opposite to the extending direction of the first wall 191A. In addition, the space A formed by the first wall 191A and the inner peripheral surface 120a in the heating space 101 may be formed at a position that is horizontally opposite to a space B between the second wall 192A and the inner peripheral surface 120a.

The second wall 192B may be formed on the other side facing one side of the inner peripheral surface 120a from which the first wall 191A is formed to protrude. That is, the second wall 192A may be formed to protrude and extend from the other side of the inner peripheral surface 120a. Thus, the end of the second wall 192A may be disposed to form a spaced space B from the one side of the inner peripheral surface 120a. That is, the one side of the inner peripheral surface 120a forming the spaced space B with the end of the second wall 192A may be understood as being the same as the one side of the inner peripheral surface 120a on which the first wall 192A is formed.

As an example, the first wall 191A may protrude from the one side of the inner peripheral surface 120a and extend downward at an angle of 30°. In this case, the second wall 192A may protrude from the other side of the inner peripheral surface 120a and extend upward at an angle of 30°. Thus, the extending directions of the first wall 191A and the second wall 192A are opposite to each other, and virtual extension lines drawn along the extending directions of the first wall 191A and the second wall 192A may be parallel to each other.

From the viewpoint of the steam flow path, the steam water and steam that have passed through the space A between the first wall 191A and the inner peripheral surface 120a may flow into a flow path (second layer) of the heating space 101 formed by a space between the first wall 191A and the second wall 192A and then flow into the space B between the end of the second wall 192A and the inner peripheral surface 120a to flow into another upper layer (third layer) of the heating space 101. Accordingly, since the steam flow path forms a flow path in a Z-shaped zigzag direction, the length of the flow path may be relatively long.

The third wall 193A may be disposed above the second wall 192A and may be formed on the one side of the inner peripheral surface 120a on which the first wall 191A is formed. For example, the third wall 193A may be formed to be parallel to the first wall 191A. That is, the third wall 193A may be formed by moving the first wall 191A upward in parallel. Therefore, the extending direction of the third wall 193A is the same as that of the first wall 191A.

That is, since the first wall 191A and the third wall 193A are formed to protrude from the inner peripheral surface 120a facing the protruding point of the second wall 192A, the first wall 191A and the third wall 193A may extend in a direction opposite to the extending direction of the second wall 192A.

Thus, at least one of the first wall 191A to the third wall 193A may be disposed inside the water level of the steam water accommodated in the heating space 101. The steam flow path forms a Z-shaped flow path, and the steam water and steam may flow in the zigzag direction and be directed to the upper layer.

Meanwhile, in the first embodiment of the present invention, the partition wall portion 190 extends in the horizontal direction, and in the second embodiment of the present invention, the partition wall portion 190 extends so as to be inclined at the inclined angle. More specifically, in the first embodiment, the water level of the steam water rises horizontally along the extending direction of the partition wall portion 190. For example, assuming that the water level is formed at a certain point in the second layer of the heating space 101, in the first embodiment, the space of the first layer is filled with the steam water, and then the water level is reached to the certain point in the second layer. On the other hand, in the second embodiment, although the same water level is formed, the water level may raise from a low position of the second layer in a state where the space of the first layer is not fully filled due to the slope of the partition wall portion 190. Thus, the area of the steam water that may bounce above the water level due to the bumping phenomenon or the like is smaller than that of the other in the second embodiment, thereby further minimizing the amount of the water discharged into the interior.

The flow interfering portion 125 may protrude from the base surface 120b of the chamber body 120 to partition the heating space 101 in the up-down direction. In detail, the flow interfering portion 125 may include a slope guide portion 125D formed to protrude upward from one point of the base surface 120b and a slope interference portion 125C spaced apart and protrude downward from the uppermost point of the slope guide portion 125D. The slope guide portion 125D and the slope interference portion 125C may be provided to form one set. Accordingly, the flow interfering portion 125 may be formed on the base surface 120b of the chamber body 120 so as to have a generally A-shaped longitudinal cross-section.

Hereinafter, a steam generator according to a third embodiment of the present invention will be described focusing on the differences from the second embodiment described above. In the third embodiment of the present invention, there is a difference in that the extending directions of the plurality of partition wall portions 190 are formed to be staggered from one another. On the other hand, in the third embodiment of the present invention, the descriptions of the first embodiment and the second embodiment refer to the description of the same configuration as the first embodiment and the second embodiment.

Referring to FIG. 6, the plurality of partition wall portions 190 may be formed such that the extending directions of partition walls are staggered from one another. The partition wall portion 190 may include a first wall 191B protruding from the inner peripheral surface 120a of the chamber body, a second wall 192B disposed above the first wall 191B, and a third wall 193B disposed above the second wall 192B.

The first wall 191B and the third wall 193B may be formed on one side of the inner peripheral surface 120a of the chamber body. The detailed descriptions of the first wall 191B and the third wall 193B refers to the descriptions of the first wall 191A and the third wall 193B in the second embodiment of the present invention described above.

The second wall 192B may be formed on the other side facing one side of the inner peripheral surface 120a on which the first wall 191A is formed. The second wall 192B may extend from the other side of the inner peripheral surface 120a in a direction staggered from an extending direction of the first wall 191B. As an example, the first wall 191B may extend to be inclined downwardly so as to have a slope of −30° from the left side surface of the inner peripheral surface 120a in the right direction. In this case, the second wall 192B may extend to be inclined downwardly to have a slope of −30° from the right side surface of the inner peripheral surface 120a in the left direction. The second wall 192B may be formed above the first wall 191B so as not to interfere with each other.

A virtual extension line drawn along the extending direction of the first wall 191B is referred to as a first extension line. A virtual extension line drawn along the extending direction of the second wall 192B is referred to as a second extension line. That is, the first extension line and the second extension line may meet at one point so as to be staggered from each other.

That is, the second wall 192B may be formed such that the longitudinal cross-section of the steam flow path becomes narrower toward the extending direction. In detail, the second wall 192B may be formed to be gradually closer to the first wall 191B toward the extending direction. Accordingly, the second wall 192B may have an extending direction staggered from the extending direction of the first wall 191B.

On the other hand, the steam water and steam may pass through the spaced space A formed by an end of the first wall 191B and the inner peripheral surface 120a from the first layer to be introduced into a second layer formed between the first wall 191B and the second wall 192B, pass through a spaced space B formed by an end of the second wall 192B and the inner peripheral surface 120a from the second layer to be introduced into a second layer formed between the second wall 192B and the third wall 193B, and pass through a spaced space C formed by an end of the third wall 193B and the inner peripheral surface 120a from the third layer to flow upward. Accordingly, the steam water may be heated and reheated along the long steam flow path having the shape of a letter Z to easily generate steam, and rising saturated steam may enable superheated steam to be more easily generated.

As described above, the cross-sectional area of the steam flow path may be gradually reduced toward the spaced spaces A, B, and C. Accordingly, a bottleneck phenomenon may be caused in the flow of the steam water. That is, since the partition walls 190 are close to each other in the spaced spaces A, B, and C, the cross-sectional area of the steam flow path may become narrow.

By narrowly forming the spaced spaces A, B, and C, which are at the points communicating upward in the steam flow path, the bumping phenomenon may be effectively suppressed.

In particular, there has been a problem in that water is blown into the steam oven because the steam water boiling up explosively and rising or bouncing upward due to the bumping phenomenon or the like are introduced into the steam discharge port located in the upper portion of the steam generator.

However, in the embodiment of the present invention, even when the steam water boils up explosively due to the bumping phenomenon, it is difficult the steam water to reach the steam discharge port 121 since the cross-sectional area of the steam flow path becomes narrower in the spaced spaces A, B and C. Therefore, the amount of water discharged into the interior may be minimized.

Further, assuming that the same water level is formed in the heating space 101, in the embodiment of the present invention, the space and the area of the steam water that may bounce upward due to the bumping phenomenon are relatively reduced by the inclined partition walls and the heat is transferred to the steam water along the steam flow path, thereby preventing the local superheating of only a specific range, and making the heat flux and the heat distribution uniform within a certain range. Therefore, the steam generator 100 according to the embodiment of the present invention may effectively suppress the bumping phenomenon.

It can be confirmed from FIG. 7 that the steam generator according to the second embodiment or the third embodiment of the present invention may improve boiler efficiency and reduce the amount of water to be discharged into the interior such as the cooking cavity as compared to the conventional steam generator.

More specifically, in the experimental result of the conventional steam generator, the amount of water discharged to the cooking chamber of the cooking device, that is, the amount of water discharged into the interior is 35 cc, and the boiler efficiency is 84.5%.

On the other hand, in the experimental result of the steam generator 100 according to the second embodiment of the present invention, the boiler efficiency is improved to 86.6% when the inclined angle of the partition wall portion 190 is 30° and the amount of water discharged into the interior is reduced to 5 cc, which indicates that the performance is improved as compared with the conventional steam generator.

In addition, in the experimental result (staggered partition walls) of the steam generator 100 according to the third embodiment of the present invention, the boiler efficiency is improved to 90.5% and the amount of water discharged into the interior is reduced to be less than 3 cc due to a plurality of partition wall portions 190 formed such that extending directions thereof are staggered from one another, which indicates that the performance is improved as compared with the conventional steam generator and the other embodiments.

Hereinafter, the operation of the steam generator according to the present invention will be described in more detail.

First, steam water is supplied to the inside of the heating chamber 110, that is, the heating space 101. For example, steam water stored in a water supply tank (not shown) may be supplied to the heating space 101 by the operation of a water supply pump (not shown).

On the other hand, the supply of the steam water to the heating space 101 is performed through the water supply port 131. The steam water supplied to the heating space 101 through the water supply port 131 hits against the partition wall portion 190 disposed below the water supply port 131 before hitting against the bottom surface of the heating space 101. Therefore, it is possible to prevent the steam water supplied to the heating space 101 through the water supply port 131 from hitting against the bottom surface of the heating space 101 and excessively bouncing.

Simultaneously with the supply of the steam water to the heating space 101 or after a predetermined time has elapsed, the steam heater 160 operates to heat the steam water stored in the heating space 101.

In this case, the heat of the steam heater 160 is transferred to the steam water stored in the heating space 101 through the heating chamber 110. The contact area of the heating chamber 110 and the steam water is increased by the contact portion 129 formed on the base surface 120b of the heating chamber 110 corresponding to the heating space 101, and therefore, the heat of the steam heater 160 is transferred to the steam water stored in the heating space 101 more efficiently.

The steam heater 160 operates to start to heat the steam water stored in the heating space 101. The heated steam water may generate saturated steam and superheated steam. For example, in the lower portion of the heating space 101, that is, in the saturated region 101A, saturated steam may be generated by heating the steam water, and in the upper portion of the heating space 101, that is, in the superheated region 101B, the superheated steam may be generated by the heating of the saturated steam transferred from the saturated region 101A. In this case, the saturated steam or superheated steam in the superheated region 101B may be more efficiently heated by the steam heater 160 due to the flow interference by the flow interfering portion 125.

The (saturated and superheated) steam generated as described above is supplied to the cooking chamber through the steam discharge port 121 and the steam injection hole. In this case, the steam discharged through the steam discharge port 121 is prevented from leaking through the gap between the side surface of the cavity 10 and one surface of the heating chamber 110 by the second packing member 150. Therefore, efficient cooking of food using the steam may be performed in the cooking chamber. As an example, in the course of cooking the food in the cooking chamber by the heating source, drying of the food may be prevented by evaporation of water.

Meanwhile, in the process of transferring heat by the steam heater 160, the bumping phenomenon may occur due to local heating, and a problem may occur that the water bounces due to the bumping phenomenon and is discharged to the steam discharge port 121.

The steam generator 100 according to the embodiment of the present invention may form a Z-shaped steam flow path along the partition wall portion 190 having a plurality of partition walls. In the heating space 101, the steam water and the steam in the heating space 101 flow along the steam flow path, so that it is possible to more uniformly form the heat flux and the heat distribution, thereby suppressing the bumping phenomenon caused by the local heating. Therefore, the phenomenon in which the steam water is introduced into the steam discharge port 121 due to the bumping phenomenon or the like in the heating space 101 may be minimized.

Hereinafter, an embodiment of a cooking device including a steam generator according to the present invention will be described in detail with reference to the accompanying drawings.

Figure 8:
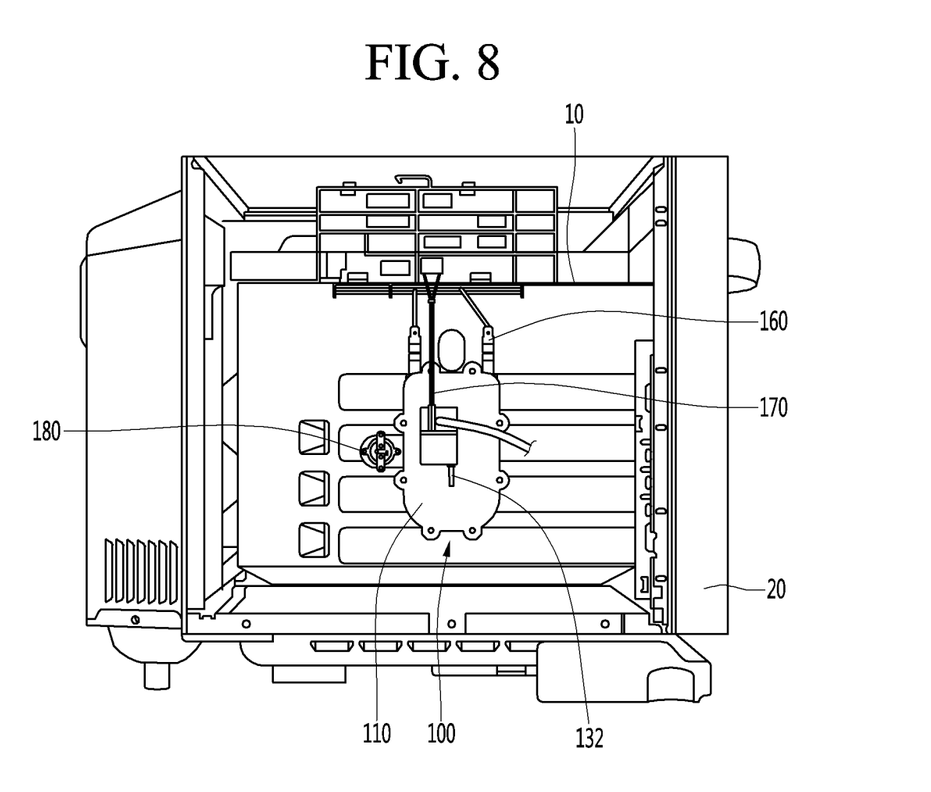
FIG. 8 is a view showing a cooking device equipped with a steam generator according to an embodiment of the present invention.

FIG. 8 is a view showing a cooking device equipped with a steam generator according to an embodiment of the present invention.

Referring to FIG. 8, a cooking chamber (not shown) is provided inside a cavity 10 of the cooking device. Food is cooked in the inside of the cooking chamber. The cooking chamber is selectively opened and closed by a door 20.

Although not shown, the cavity 10 is provided with a plurality of heating sources for providing heat for cooking food in the inside of the cooking chamber. For example, a magnetron (not shown) for irradiating a microwave into the inside of the cooking chamber or a heater (not shown) for providing heat of the heater transferred to the inside of the cooking chamber may be used as the heating source.

The steam generator 100 is installed on one side of the cavity 10. The steam generator 100 generates steam. The steam generated in the steam generator 100 is supplied to the inside of the cooking chamber and is used for cooking food. Therefore, in the present embodiment, at least one of the heating sources, that is, the magnetron, the heater, and the steam generator 100 operates according to a user's selection, thereby cooking food in the inside of the cooking chamber.

The invention claimed is:

1. A steam generator comprising:
a chamber body that defines a heating space configured to receive steam water, the chamber body including a base surface and a steam discharge port;
a flow interfering portion that protrudes from the base surface and that is spaced apart from the steam discharge port, the flow interfering portion being configured to interfere with steam flow in the chamber body;
a steam heater configured to heat the steam water stored in the heating space to generate steam;
a partition wall portion disposed on an inner surface of the chamber body below the flow interfering portion, the partition wall portion defining a steam flow path configured to guide the steam water and the steam,
wherein the partition wall portion includes:
a first wall that extends from a first side of the inner surface of the chamber body toward a second side of the inner surface of the chamber body, the first wall being inclined by a first inclined angle with respect to a lower side of the chamber body, and
a second wall that is disposed above the first wall and that extends from the second side of the inner surface of the chamber body toward the first side of the inner surface of the chamber body, the second wall being inclined by a second inclined angle with respect to the lower side of the chamber body, and
wherein the flow interfering portion is inclined with respect to the lower side of the chamber body, the first side of the inner surface of the chamber body, and the second side of the inner surface of the chamber body.

2. The steam generator of claim 1, wherein the partition wall portion further includes a third wall that is disposed above the second wall and that extends in a third inclined angle with respect to the lower side of the chamber body, and wherein the third inclined angle is equal to the first inclined angle.

3. The steam generator of claim 2, wherein the steam flow path has a shape of a letter Z along a space defined by the first wall, the second wall, and the third wall.

4. The steam generator of claim 2, wherein the second wall extends from the second side of the inner surface of the chamber body in a direction that intersects an extending direction of the first wall from the first side of the inner surface of the chamber body.

5. The steam generator of claim 4, wherein a cross-sectional area of the steam flow path decreases toward an end of the first wall connected to the first side of the inner surface of the chamber body and toward an end of the second wall connected to the second side of the inner surface of the chamber body.

6. The steam generator of claim 1, further comprising:
a chamber cover that is coupled to the chamber body and that defines the heating space with the chamber body,
wherein the partition wall portion divides the heating space into a plurality of layers that are arranged in a vertical direction and that are configured to guide the steam water and the steam in a zigzag direction.

7. The steam generator of claim 6, wherein a distal end of the first wall is spaced apart from the second side of the inner surface of the chamber body, and
wherein a distal end of the second wall is spaced apart from the first side of the inner surface of the chamber body.

8. The steam generator of claim 1,
wherein the first inclined angle and the second inclined angle are in a range of angles from 15° to 45°.

9. The steam generator of claim 1, wherein the flow interfering portion comprises a slope guide portion that extends in an upward direction from the first side of the inner surface of the chamber body toward the second side of the inner surface of the chamber body.

10. The steam generator of claim 9, wherein the flow interfering portion further comprises a slope interference portion that extends in a downward direction from a position corresponding to an uppermost point of the slope guide portion toward the second side of the inner surface of the chamber body.

11. The steam generator of claim 10, wherein the slope guide portion and the slope interference portion are spaced apart from each other in a lateral direction.

12. The steam generator of claim 10, wherein the slope guide portion and the slope interference portion are symmetrical to each other.

13. The steam generator of claim 1, wherein the flow interfering portion defines a V-shape on the inner surface of the chamber body.

14. The steam generator of claim 1, wherein the second inclined angle is equal to the first inclined angle.

15. The steam generator of claim 1, wherein the second inclined angle is different from the first inclined angle.

16. A cooking device comprising:
a cabinet that defines a cooking chamber;
a door configured to selectively open and close the cooking chamber; and
a steam generator configured to generate a steam to be supplied to the cooking chamber,
wherein the steam generator comprises:
a chamber body that defines a heating space configured to receive steam water, the chamber body including a base surface and a steam discharge port,
a flow interfering portion that protrudes from the base surface and that is spaced apart from the steam discharge port, the flow interfering portion being configured to interfere with steam flow in the chamber body,
a steam heater configured to heat the steam water stored in the heating space to generate steam, and
a partition wall portion disposed on an inner surface of the chamber body below the flow interfering portion, the partition wall portion defining a steam flow path configured to guide the steam water and the steam,
wherein the partition wall portion comprises:
a first wall that extends from a first side of the inner surface of the chamber body toward a second side of the inner surface of the chamber body, the first wall being inclined by a first inclined angle with respect to a lower side of the chamber body, and
a second wall that is disposed above the first wall and that extends from the second side of the inner surface of the chamber body toward the first side of the inner surface of the chamber body, the second wall being inclined by a second inclined angle with respect to the lower side of the chamber body, and
wherein the flow interfering portion is inclined with respect to the lower side of the chamber body, the first side of the inner surface of the chamber body, and the second side of the inner surface of the chamber body.

17. The cooking device of claim 16, wherein the partition wall portion further includes a third wall that is disposed above the second wall and that extends in a third inclined angle with respect to the lower side of the chamber body, and
wherein the third inclined angle is equal to the first inclined angle.

18. The cooking device of claim 17, wherein the steam flow path has a shape of a letter Z along a space defined by the first wall, the second wall, and the third wall.

19. The cooking device of claim 17, wherein the second wall extends from the second side of the inner surface of the chamber body in a direction that intersects an extending direction of the first wall from the first side of the inner surface of the chamber body.

20. The cooking device of claim 19, wherein a cross-sectional area of the steam flow path decreases toward an end of the first wall connected to the first side of the inner surface of the chamber body and toward an end of the second wall connected to the second side of the inner surface of the chamber body.

* * * * *